Nov. 10, 1953   V. E. SPROUSE   2,658,577
COMPOSITE FAN HUB
Filed Dec. 20, 1949

INVENTOR,
VERNER E. SPROUSE,
By Herbert A. Minturn,
ATTORNEY.

UNITED STATES PATENT OFFICE 2,658,577

COMPOSITE FAN HUB

Verner E. Sprouse, Columbus, Ind.

Application December 20, 1949, Serial No. 134,053

1 Claim. (Cl. 170—173)

This invention relates to a composite driving hub used in one particular instance as a means for mounting a fan and driving the fan from a drive shaft.

The primary object of the invention is to provide a hub construction which will be extremely durable in usage and at the same time be relatively simple and of a low cost of production. In this regard, the invention provides a structure which may be formed through simple operations in the absence of turning over beads, or lips requiring an adidtional operation over and above a drawing operation of a sheet metal part.

A further important object of the invention is to provide a simple interlocking means between two members of the hub, and simultaneously securing the hub to its driving shaft.

Figure 1:
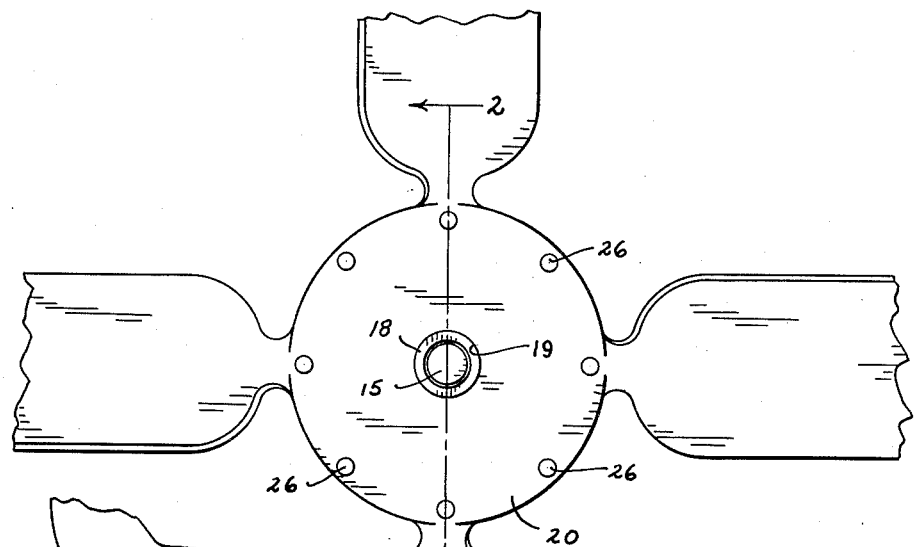
Figure 2:
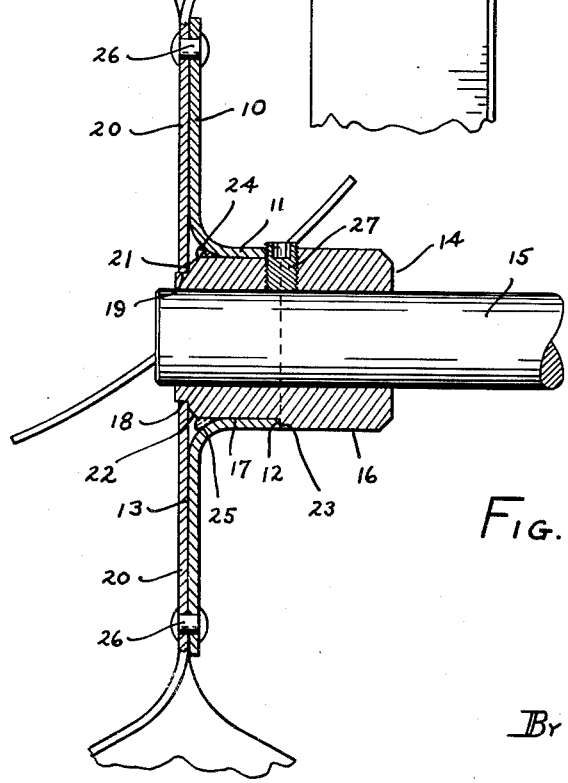

These and other objects and advantages of the invention will become apparent to those versed in the art in the following description of one particular form of the invention as illustrated in the accompanying drawing, in which Fig. 1 is a view in fragmentary front elevation of a structure embodying the invention; and Fig. 2 is a view on an enlarged scale in section on the line 2—2 in Fig. 1.

A circular metallic disk 10 has a central neck 11 formed to extend integrally therefrom on a central axis perpendicular to the faces of the disk 10. This neck 11 is tubular in nature and has its rear end portion 12 terminating in a plane parallel to the front face 13 of the disk 10. The longitudinal length of this neck 11 is made to be substantially less than the over-all length of the hub itself. In the present showing, the longitudinal length of this neck 11 is made to approximate half the length of the finished hub. This of course is subject to variation depending upon the conditions to be encountered, under which the hub is to be used.

A hub core generally designated by the numeral 14 is axially bored throughout its length to a diameter to receive the driving shaft 15, Fig. 2. A rear portion of the hub 14 is provided with an external circumferential portion 16 having a diameter substantially equal to the diameter of the external portion of the neck 11. The remaining longitudinal length of the core 14 is provided with a reduced diameter surface 17, this portion being made of that diameter which will permit it to be entered through the inside of the neck 11.

The outer end portion of the hub core 14, the left-hand end as viewed in Fig. 2, is provided with a still further reduced diameter circumferential surface 18. The diameter of this surface 18 is made to be such that it may be snugly slipped through the bore 19 of the object to be mounted on the hub, herein shown as a fan spider 20. Thus this portion 18 will form a pilot, central aligning bearing for the spider 20.

The longitudinal length of the circumferential portion 17 is made to be approximately the length of the distance between the neck face 12 and the outer or left-hand face 13 of the disk 10. Preferably this length is a few thousandths at least less than that distance so that the spider 20 may be fitted on the portion 18 and allowed to come into contact with the face 13 without being held thereaway by the shoulder 21 at the junction of the circumferential surfaces 17 and 18. As indicated in the drawing, Fig. 2, the hub core 14 is provided with a break 22 between the shoulder 21 and the surface 17.

The neck 11 is telescoped over the hub core surface 17, to have its rear face 12 come into abutment with the radial face 23 appearing between the surfaces 16 and 17. This face 23 serves as a positive limiting stop to locate the neck 11 on the surface 17 to have the face 13 substantially within the plane of the shoulder 21. The neck 11 is secured to the surface 17 by any suitable means such as by soldering or brazing to have the soldering or brazing material 24 flow in between the inner face of the neck 11 and the surface 17 to form an intimate bond therebetween. Entrance between those surfaces is facilitated by reason of the fact that there is a radius 25 formed between the disk 10 and the neck 11 in the drawing or forming operation to extend the neck 11 from the disk 10.

The fan spider 20 is fixed to the disk 10 by any suitable means such as by rivets 26 removed from the longitudinal axis through the hub core 14 to an outer portion of the disk 10. It is intended that the shaft 15 be rotated in that direction which will cause the reactive pressure of the spider 20 to be directed toward the face 13 of the disk 10. In this manner, the rivet 26 will provide the rotative interconnection driving means between the spider 20 and the disk 10.

The combined hub core 14 and the neck 11, then being to all intents and purposes an integral combination is bored radially from one side, centrally of the junction of the faces 12 and 23 to receive screw-threadedly through the core portion 14 a set screw 27. The set screw forms at least one means of drivingly attaching the hub core 14 to the driving shaft 15. By locating the set screw 27 as indicated, it drives both the neck 11 as well as the core 14, so that the driving of the disk 10 is not only through the intervening material 24, but also is driven by the set screw 27. In other words the set screw drives the neck 11 in a circumferential manner as well as it does the hub core 14. The material 24 then has but the one strain imposed upon it, and that is any tendency of the neck 11 to slip along the surface 17 to the left, which would be in the direction normally opposite to the thrust on the disk 10.

While I have herein shown and described my invention in the one particular form, it is obvious that structural variations may be employed without departing from the spirit of the invention, and I therefore do not desire to be limited to that precise form beyond the limitations which may be imposed by the following claim.

I claim:

A fan mounting comprising a three step, cylindrical hub core having a major constant diameter rear end portion, a minor constant diameter front end portion, and an intermediate constant diameter portion between said major and minor diameter portions; a shoulder at the rear end of said minor diameter portion; a second shoulder at the rear end of said intermediate diameter portion; a hub neck having a bore therethrough substantially equal in diameter to said core intermediate diameter; said hub neck being entered over said core minor and intermediate diameter portions and surrounding said intermediate diameter portion only with the rear end of the hub neck abutting said second shoulder, the overall length of said hub neck axially of said core being substantially that of said intermediate diameter portion between said two shoulders; means operatively connected to said hub core for retaining said hub neck in abutment with said second shoulder; a fan spider having a central bore, receiving said core minor diameter portion therethrough to center the spider on the core; a member extending from said hub neck in a plane substantially normal to the axis of said core at said first shoulder; said spider bearing by its rear face against said hub neck member and also bearing against said first shoulder to have thrust of the spider taken through said hub neck against said second shoulder; and means securing the spider to said hub neck member.

VERNER E. SPROUSE.

References Cited in the file of this patent

UNITED STATES PATENTS

| Number | Name | Date |
| --- | --- | --- |
| 1,415,542 | Fuegel et al. | May 9, 1922 |
| 1,466,948 | Bryant | Sept. 4, 1923 |
| 1,888,681 | Lauszat | Nov. 22, 1932 |
| 2,290,011 | Bahr | July 14, 1942 |
| 2,409,385 | Pletcher | Oct. 15, 1946 |
| 2,487,128 | Hahn | Nov. 8, 1949 |
| 2,497,242 | Sprouse | Feb. 14, 1950 |